United States Patent [19]

Schmidt

[11] 4,023,172
[45] May 10, 1977

[54] MONOPULSE SYSTEM FOR CANCELLATION OF SIDE LOBE EFFECTS

[75] Inventor: Charles J. Schmidt, Bergenfield, N.J.

[73] Assignee: Numax Electronics Incorporated, Hauppauge, N.Y.

[22] Filed: Dec. 17, 1959

[21] Appl. No.: 860,289

[52] U.S. Cl. .................. 343/16 M; 343/100 LE
[51] Int. Cl.² .................. G01S 3/32; G01S 9/22
[58] Field of Search .......... 343/100.12, 17.1, 113, 343/16, 106, 16 M, 100 LE, 16.1

[56] References Cited

UNITED STATES PATENTS

| | | | |
|---|---|---|---|
| 1,154,897 | 11/1957 | Blassel | 343/16.1 |
| 2,804,614 | 8/1957 | Alvarez | 343/16 |
| 2,825,900 | 3/1958 | Collbohm | 343/113 |

FOREIGN PATENTS OR APPLICATIONS

| | | | |
|---|---|---|---|
| 720,354 | 12/1954 | United Kingdom | 343/17.1 |
| 786,661 | 11/1957 | United Kingdom | 343/100.12 |

*Primary Examiner*—Malcolm F. Hubler

EXEMPLARY CLAIM

1. A radio receiving system comprising a directional antenna having a boresight axis and a pair of main antenna feed horns equally spaced from and normal to said axis, with an auxiliary pair of similar antenna feed horns disposed in alignment with the main pair and spaced farther from said axis, a multiple channel receiver, first feed means connecting a first channel of said receiver to the main pair of said antenna feed horns for providing a first output said first output having a radiation receiving pattern including a desired main lobe and undesired side lobes, second feed means connected to said auxiliary pair of antenna feed horns, and means in said receiver connected to said second feed means for providing a second output, said second output having a directional receiving pattern which is greater than said radiation pattern at all angles beyond those defining a central portion of the main lobe, and means for obtaining a signal output from said receiver in response to the difference between said first and second outputs.

14 Claims, 2 Drawing Figures

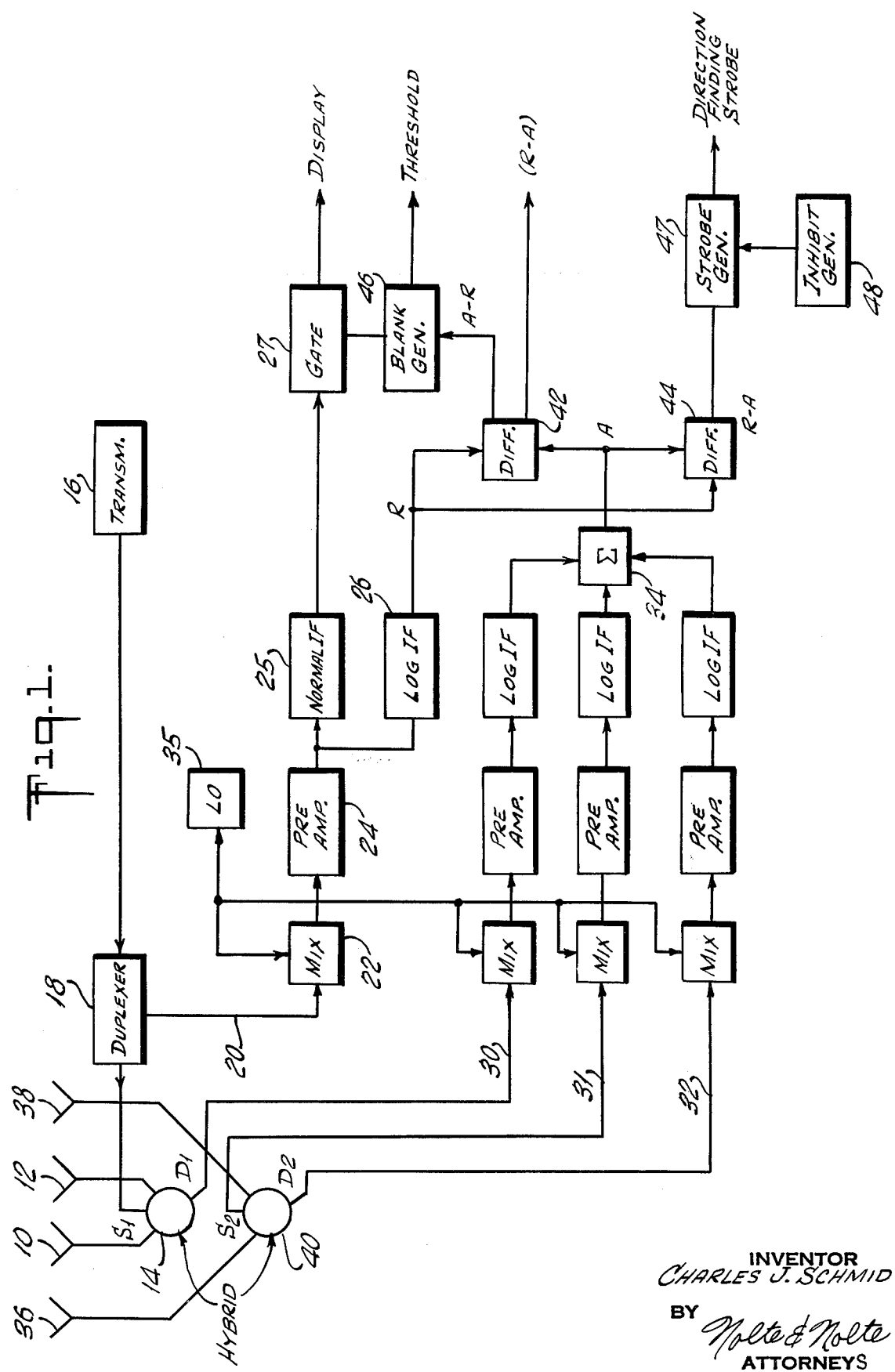

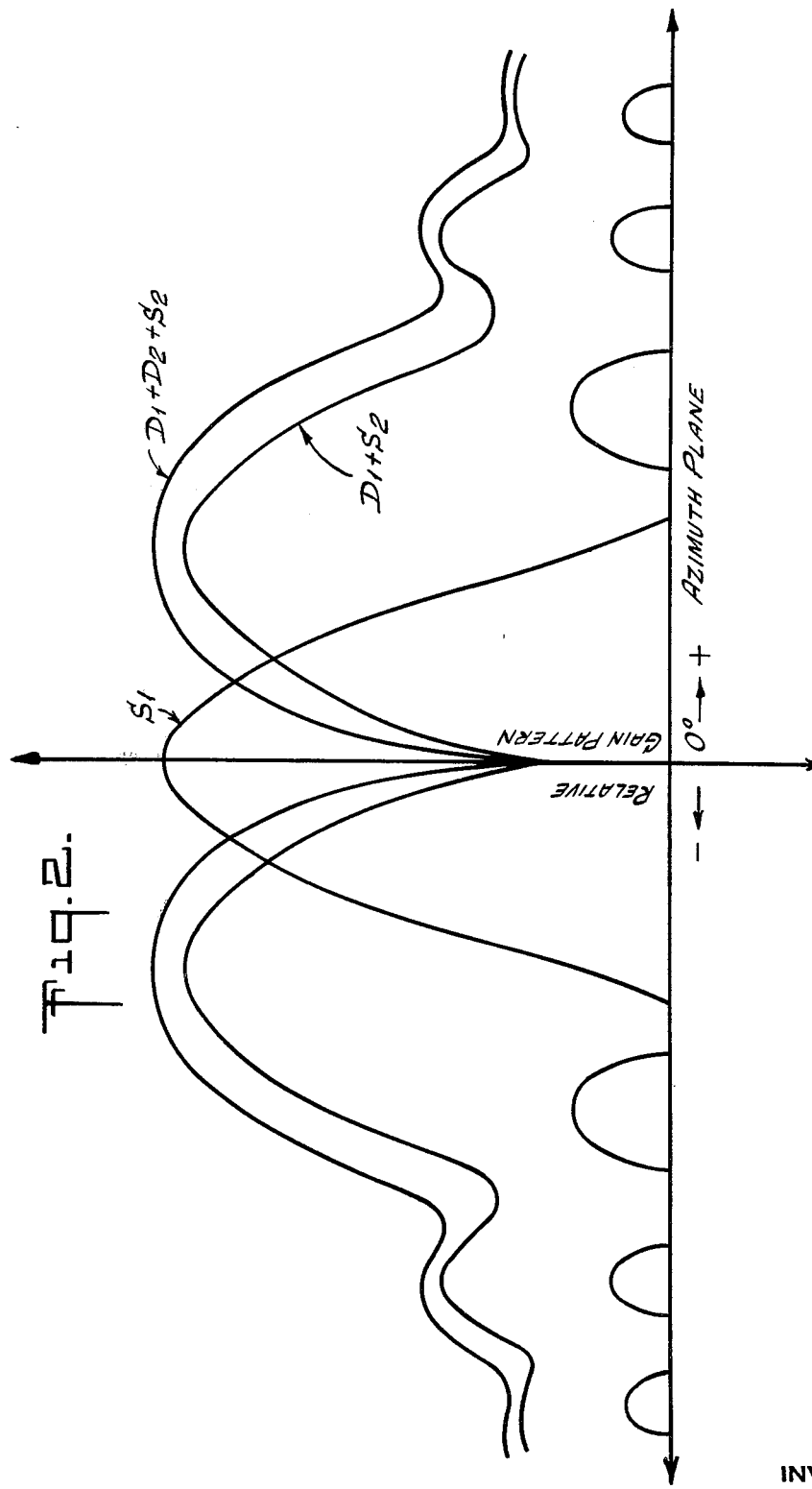

MONOPULSE SYSTEM FOR CANCELLATION OF SIDE LOBE EFFECTS

The present invention relates to the cancellation of side lobes in directional radio receiving systems, and more particularly in radar systems.

In radar systems, especially monopulse radar systems, it is desirable to provide side lobe cancellation, that is the suppression of echo reception in the direction of side lobes of the antenna radiation. For this purpose, an auxiliary antenna system can be used, as has been heretofore proposed, including a separate auxiliary antenna or antennas. The complexity of the auxiliary antenna system will depend upon the radar side lobe level, vertical coverage, side lobe cross-polarization content, and the antenna band width requirements. Thus, for example, as heretofore proposed, the auxiliary antenna system may consist of one or more omnidirectional antennas, directive antennas, or a combination of the two types. The directive auxiliary antennas must be aligned and rotated in synchronism with the radar antenna or superimposed upon the radar antenna structure.

The auxiliary antenna technique of side lobe cancellation, as taught by such prior proposals, entails certain difficulties since it involves separate phase centers of the radar and the auxiliary antennas, which is undesirable from the standpoint of multiple interference or jamming.

One of the main objects of the present invention is to provide a directional radar system in which the main antenna system and the auxiliary antenna system have a common phase center.

Another factor which may materially complicate the design of the auxiliary antenna in prior proposed systems, is the cross-polarization content of the radar side lobes. It is known that linearly polarized radars may have cross polarized fields of appreciable magnitude near the main beam and at wide angles, particularly with off-set feeds. At wide angles, the resultant field is elliptically polarized. If the magnitude of the cross-polarization component is comparable to that of the principal polarization component, then the effect of a circularly polarized jammer or interference source would be to increase the response in the radar side lobe by as much as 3 db. Also, if the auxiliary antenna were linearly polarized, having negligible cross-polarization, the effective gain would be reduced by 3 db. The relative change in magnitude between the two signals would be −6 db.

To circumvent the difficulties encountered with the prior auxiliary antenna system and to afford greater effectiveness in a multiple interference or jamming environment, a multi-horn monopulse technique is used herein. A monopulse feed is provided consisting of four or more horns linearly aligned and oriented in the horizontal plane. The center pair of horns constitute a dual monopulse feed system. The center pair of horns as shown in FIG. 1, is connected to a hybrid, providing sum and difference connections or channels. The transmitter is connected to the sum connection and produces a radiation pattern $S_1$ having a main beam and side lobes. At the difference terminal of the hybrid coupler the signals relative to the antenna radiation pattern $D_1$ is different from those relative to the sum connection for $S_1$. In particular, a null appears relative to the difference radiation pattern $D_1$ where the peak of the main beam appears relative to the sum pattern $S_1$. The outer horns are similarly connected to one or more hybrid couplers with sum and difference outputs $S_2$ and $D_2$, respectively. Since the crossover level of the two beams of an outer pair of horns is lower than that for the inner pair of horns, due to wider spacing, the response $S_2$ in the sum connection of the hybrid for the outer horns will be less than that of the peak direction of the main beam $S_1$ of the first hybrid. The outputs of the hybrids are connected to a multi-channel receiver so that side lobe cancellation is obtained.

The invention will be fully understood from the following detailed description thereof and the accompanying drawings wherein:

FIG. 1 is a block diagram of one embodiment of the invention; and

FIG. 2 is diagram explanatory of the operation of the circuit of FIG. 1.

Referring to FIG. 1, there is shown a monopulse radar system in which the antenna system includes a reflector 50 and a pair of feed horn radiators 10 and 12 which may be aligned in a horizontal direction and suitably spaced from each other so as to have overlapping radiation patterns. Horns 10 and 12 are connected to a hybrid coupler 14 of the type commonly used in monopulse radar systems. The hybrid has a sum terminal or connection $S_1$ and a difference connection $D_1$. A radar transmitter 16 is connected through a duplexer 18 to the sum connection $S_1$. A multi-channel radar receiver has a first channel 20 connected through duplexer 18 to the hybrid connection $S_1$. Channel 20 may consist of a mixer 22, a preamplifier 24, logarithmic amplifier 26 connected in series to a point R. The output of preamplifier 24 is also connected through an IF amplifier 25 to a gating circuit 27 which may supply display apparatus and other radar devices. The receiver also includes second, third and fourth channels 30, 31 and 32, each including a mixer, a preamplifier and a logarithmic amplifier similar to those of channel 20 and having their outputs connected to a summing circuit 34. Channel 30 is connected to terminal $D_1$ of hybrid 14. The mixers of all receiver channels are connected to a heterodyne oscillator 35. Logarithmic amplifiers are used to make amplitude comparison over the wide range of jamming and interfering signals possible. A limiting receiver cannot distinguish between amplitude levels after the limit level has been reached.

The antenna system includes at least one additional pair of auxiliary electromagnetic horns 36 and 38 connected to a hybrid 40. Horns 36 and 38 are linearly aligned with and oriented in the same horizontal plane as the horns 10 and 12, and appropriately spaced to establish the related wave pattern to permit the addition and subtraction explained herein and employed for side lobe suppression and cancellation. The sum terminal $S_2$ of hybrid coupler 40 is connected to channel 31 and the difference $D_2$ may be connected to channel 32. Alternatively the channel 32 may be dispensed with, where the pattern $D_1$ plus $S_2$ is adequate to provide the desired side lobe cancellation.

Analysis has shown that theoretically $D_1$ and $S_2$ should be adequate to meet the above condition. However, practical antenna designs always have very sharp nulls in the side lobe response. Therefore, channel 32, which is the $D_2$ response, may have to be added to fill these nulls. Furthermore, a third pair of feedhorns and a third hybrid may be added to the system if the combined response of $D_1$, $D_2$ and $S_2$ is inadequate.

Referring to FIG. 2 curve $S_1$ shows approximately the radiation pattern obtained at terminal $S_1$ of hybrid coupler 14. The curve $D_1 + S_2$ shows the output, A, of the summing circuit 34 for channels 30 and 31 and the curve $D_1 + D_2 + S_2$ shows the output, A, when channels 30, 31 and 32 are used. These curves show that the combination of $S_2$, $D_1$ and $D_2$, or, alternatively, $D_1$ plus $S_2$, produce a video sum pattern which is everywhere greater than the radar pattern $S_l$ except in the main beam.

As previously stated, the cross-over level of the two main beams of the outer pair is lower than the cross-over for the inner pair. Such outer cross-over is arranged at such lower level to be near the null of the individual horn patterns, so the curve $D_1 + D_2 + S_2$ will have the sharp null indicated in FIG. 2.

The amplitude of $S_2$ at 0° azimuth will decrease with separation of horns 36 and 38. It is not expected that $S_2$ will be required to approach as deep a null as $D_1$ and $D_2$ for practical separation of the feedhorns. The null will equal the individual horn pattern cross-over level plus 3 db.

By connecting summing circuit 34 and amplifier 26 to subtraction circuits 42 and 44 the differences A-R and R-A between the outputs of channel 20 and the outputs of the summing circuit 34 may be obtained. The output A-R may be supplied to a blanking generator 46 which controls a gate 27, so that whenever A-R is positive and exceeds the threshold of blanking generator 46, a blanking pulse is generated and blocks gate 27 for the time that (A-R) the auxiliary amplitude (A) minus the radar amplitude (R) exceeds the threshold. Hence gate 27 will be blocked against the reception of side lobe echoes. Whenever the quantity A-R is negative or does not exceed the threshold voltage value applied to blanking generator 46 the gate 27 may be opened to receive main beam echoes. A quantity R-A produced by the difference or subtraction circuit 42 may be used for various radar purposes such as generating a direction finding strobe.

The actual distance between the antennas is not critical and will depend primarily upon the radiation patterns of the individual horns. It is only necessary that the horns be spaced far enough apart to make a response in channel $S_2$ lower than that in $S_1$. In order to obtain the sharp null of the curve labelled $D_1 + D_2 + S_2$ in FIG. 2, the horns must be separated so that the cross-over would be near the null of the individual horn patterns.

While I have shown and described particularly one embodiment of my invention in order to illustrate the principles thereof, it will be understood by those skilled in the art that many modifications and variations of the invention may be made without departing from the spirit and scope of the invention as defined in the following claims.

I claim:

1. A radio receiving system comprising a directional antenna having a boresight axis and a pair of main antenna feed horns equally spaced from and normal to said axis, with an auxiliary pair of similar antenna feed horns disposed in alignment with the main pair and spaced farther from said axis, a multiple channel receiver, first feed means connecting a first channel of said receiver to the main pair of said antenna feed horns for providing a first output said first output having a radiation receiving pattern including a desired main lobe and undesired side lobes, second feed means connected to said auxiliary pair of antenna feed horns, and means in said receiver connected to said second feed means for providing a second output, said second output having a directional receiving pattern which is greater than said radiation pattern at all angles beyond those defining a central portion of the main lobe, and means for obtaining a signal output from said receiver in response to the difference between said first and second outputs.

2. A system according to claim 1, wherein said last named means includes a gate circuit in said receiver and means for blocking the gate circuit when the second output minus the first output exceeds a given threshold value.

3. A radar system comprising a first directional antenna and having a boresight axis and a first pair of antenna feed horns disposed at equal spacing on opposite sides of and transverse to said boresight axis, a hybrid coupler connected to said first pair of antenna feed horns and having sum and difference connections, a radar transmitter, a multiple-channel radar receiver, means connecting said transmitter and one channel of said receiver to the sum connection of the hybrid coupler, a connection between the difference connection of the coupler and the input of a second channel of the receiver, a second directional antenna having a second pair of antenna feed horns disposed on opposite sides of said boresight axis and equally spaced beyond the first pair, and having a radiation pattern different from the radiation pattern of the first antenna by reason of the different spacing, a second hybrid coupler connected to the second pair of antenna feed horns and having a sum connection connected to an input terminal of a third receiver channel, and means for obtaining the difference between the output of the first receiver channel and the sum of the outputs of the other channels.

4. A system according to claim 3, including a fourth receiving channel connected between said last mentioned means and the difference connection of the second hybrid coupler.

5. A monopulse radar system comprising a first pair of directional antenna feed horns equally spaced transverse to and on opposite sides of a boresight axis, and a hybrid coupler connected to said first pair of antenna feed horns and having sum and difference connections, a radar transmitter, a multiple-channel radar receiver, a duplexer connecting said transmitter and one channel of said receiver to the sum connection of the hybrid coupler, a connection between the difference connection of the coupler and the input of a second channel of the receiver, a second pair of directional antenna feed horns with one of the pair located on each side of the axis and beyond the first pair of antenna feed horns and in substantial alignment therewith, a second hybrid coupler connected to the second pair of antenna feed horns and having a sum connection connected to an input terminal, a third receiver channel, and means for subtracting from the output of the first receiver channel the sum of the outputs of the other channels.

6. A system according to claim 5, including a fourth receiver channel connecting the difference connection of the second hybrid coupler to the subtracting means.

7. A monopulse radar system comprising a first pair of spaced aligned antenna feed horns equally spaced transverse to and on opposite sides of a boresight axis, and a hybrid coupler connected to said antennas and having sum and difference connections, a radar transmitter, a multiple-channel radar receiver, means connecting said transmitter and one channel of said receiver to the sum connection of the hybrid coupler, a connection between the difference connection of the coupler and the input of a second channel of the receiver, a second pair of aligned antenna feed horns with one located on each side of the axis and beyond the first pair of antenna feed horns and in substantial alignment therewith, a second hybrid coupler connected to the second pair of antenna feed horns and having a sum connection connected to an input terminal of a third receiver channel, and means for subtracting the output of the first receiver channel from the sum of the outputs of the other channels.

8. A system according to claim 7, wherein each of said channels includes a logarithmic amplifier.

9. A system according to claim 7, including a gate circuit connected to the first receiver channel, and means responsive to the last mentioned means for controlling said gate circuit.

10. A system according to claim 9, including means for subtracting from the output of the first channel the sum of the outputs of the other channels.

11. A radar system comprising an antenna having a boresight axis, said antenna comprising a pair of main directional antenna feed horns equally spaced on opposite sides of and normal to said axis and oriented parallel to said axis, and a pair of auxiliary directional antenna feed horns also spaced on opposite sides of and normal to said axis and similarly oriented with greater inter-element spacing than between the main pair; feeds to the respective pairs of feed horns; and means combining the feeds to the two pairs of antenna feed horns to derive sum and difference signal effects from each pair for use in counteracting and suppressing side lobe signal components developed at said main feed horns.

12. A radar system as in claim 11, in which the feed horns of each pair of antennas are equally and symmetrically spaced relative to said boresight axis, whereby the field effects of both pairs have a common phase center.

13. A side lobe suppression circuit for use with a radar antenna system having a boresight axis, said antenna system comprising a pair of main directional antennas and a pair of auxiliary directional antennas having a cross-over level lower than that of said first pair, means for producing signals $S_1$ and $D_1$ relative to the sum and difference, respectively, of the signals translated by said first pair of antennas, means for producing a signal $S_2$ relative to the sum of the signals translated by said second pair of antennas, and means responsive to said sum and difference signals for suppressing undesired side lobes of the radiation pattern of said antenna system.

14. A side lobe suppression circuit according to claim 13, wherein said means for suppressing includes means for producing a combined signal relative to $D_1 + S_2$, means for comparing said combined signal with $S_2$, and means for suppressing the translated signals when $D_1 + S_2$ is greater than $S_1$.

* * * * *